United States Patent [19]
Sharpless

[11] Patent Number: 5,678,510
[45] Date of Patent: Oct. 21, 1997

[54] FLEA POWDER DISPENSING MITTEN

[76] Inventor: Justine Sharpless, 46650 Ocean View Dr., Anchor Bay, Calif. 95445-5039

[21] Appl. No.: 578,214

[22] Filed: Dec. 26, 1995

[51] Int. Cl.⁶ ............................................. A01K 13/00
[52] U.S. Cl. ............................................. 119/605
[58] Field of Search ............................... 119/605, 652; 401/7, 200; 15/104.93, 229.11

[56] References Cited

U.S. PATENT DOCUMENTS

| 674,913 | 5/1901 | Pike | 401/7 |
|---|---|---|---|
| 2,233,686 | 3/1941 | Topjian | 401/200 X |
| 2,279,100 | 4/1942 | Worth et al. | 401/7 |
| 2,762,158 | 9/1956 | Duffey | 119/652 |
| 3,473,699 | 10/1969 | Pike | 401/7 X |
| 4,457,640 | 7/1984 | Anderson | 401/7 |

*Primary Examiner*—Robert P. Swiatek

[57] ABSTRACT

A flea powder dispensing mitten comprised of a mesh pouch securable to an inner surface of a mitten. The mesh pouch has hook and loop fasteners on opposing sides thereof to facilitate closure of an open lower end. The mesh pouch is adapted for receipt of a flea powder therein for application on a pet.

1 Claim, 2 Drawing Sheets

FLEA POWDER DISPENSING MITTEN

BACKGROUND OF THE INVENTION

1. Field of the Invention

The present invention relates to a flea powder dispensing mitten and more particularly pertains to dispensing flea powder through a meshwork associated therewith with a flea powder dispensing mitten.

2. Description of the Prior Art

The use of powder applicators is known in the prior art. More specifically, powder applicators heretofore devised and utilized for the purpose of applying powder are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,473,699 to Pike discloses a powder dispensing glove.

U.S. Pat. No. 4,865,482 to Van Landingham discloses a pet flea and tick brush.

U.S. Pat. No. Des. 323,431 to de Mayo discloses the ornamental design for a flea powder applicator.

U.S. Pat. No. Des. 298,585 to Dolan et al. discloses the ornamental design for a chemical dispensing brush for use in flea exterminating.

U.S. Pat. No. 3,995,597 to Warwick discloses a flea powder dispenser.

U.S. Pat. No. 3,886,897 to Unwin discloses a powder applicator.

While these devices fulfill their respective, particular objective and requirements, the aforementioned patents do not describe a flea powder dispensing mitten for dispensing flea powder through a meshwork associated therewith.

In this respect, the flea powder dispensing mitten according to the present invention substantially departs from the conventional concepts and designs of the prior art, and in doing so provides an apparatus primarily developed for the purpose of dispensing flea powder through a meshwork associated therewith.

Therefore, it can be appreciated that there exists a continuing need for new and improved flea powder dispensing mitten which can be used for dispensing flea powder through a meshwork associated therewith. In this regard, the present invention substantially fulfills this need.

SUMMARY OF THE INVENTION

In the view of the foregoing disadvantages inherent in the known types of powder applicators now present in the prior art, the present invention provides an improved flea powder dispensing mitten. As such, the general purpose of the present invention, which will be described subsequently in greater detail, is to provide a new and improved flea powder dispensing mitten and method which has all the advantages of the prior art and none of the disadvantages.

To attain this, the present invention essentially comprises a mitten having an inner surface and an outer surface secured along marginal edges thereof to define a hand receiving chamber. The mitten has an open hand receiving portion for receipt of a hand therethrough into the hand receiving chamber. The mitten has a four finger section and a thumb section. A mesh pouch is secured to the inner surface of the mitten. The mesh pouch has an open lower end. The open lower end has hook and loop fasteners on opposing ends thereof to facilitate closure of the open lower end. The mesh pouch is adapted for receipt of a flea powder therein for application on a pet.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved flea powder dispensing mitten which has all the advantages of the prior art powder applicators and none of the disadvantages.

It is another object of the present invention to provide a new and improved flea powder dispensing mitten which may be easily and efficiently manufactured and marketed.

It is a further object of the present invention to provide a new and improved flea powder dispensing mitten which is of durable and reliable construction.

An even further object of the present invention is to provide a new and improved flea powder dispensing mitten which is susceptible of a low cost of manufacture with regard to both materials and labor, and which accordingly is then susceptible of low prices of sale to the consuming public, thereby making such a flea powder dispensing mitten economically available to the buying public.

Still yet another object of the present invention is to provide a new and improved flea powder dispensing mitten which provides in the apparatuses and methods of the prior art some of the advantages thereof, while simultaneously overcoming some of the disadvantages normally associated therewith.

Even still another object of the present invention is to provide a new and improved flea powder dispensing mitten for dispensing flea powder through a meshwork associated therewith.

Lastly, it is an object of the present invention to provide a new and improved flea powder dispensing mitten comprised of a mesh pouch securable to an inner surface of a mitten. The mesh pouch has means to facilitate closure of an open lower end. The mesh pouch is adapted for receipt of a flea powder therein for application on a pet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
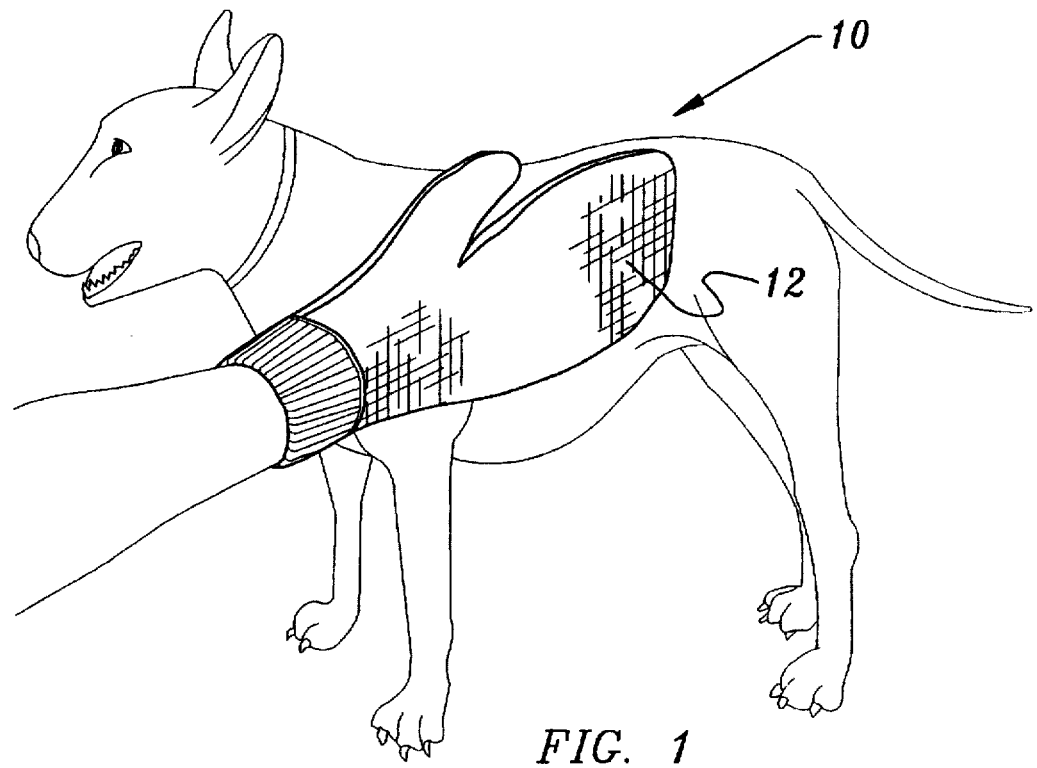
FIG. 1 is a perspective view of the preferred embodiment of the flea powder dispensing mitten constructed in accordance with the principles of the present invention.
Figure 2:
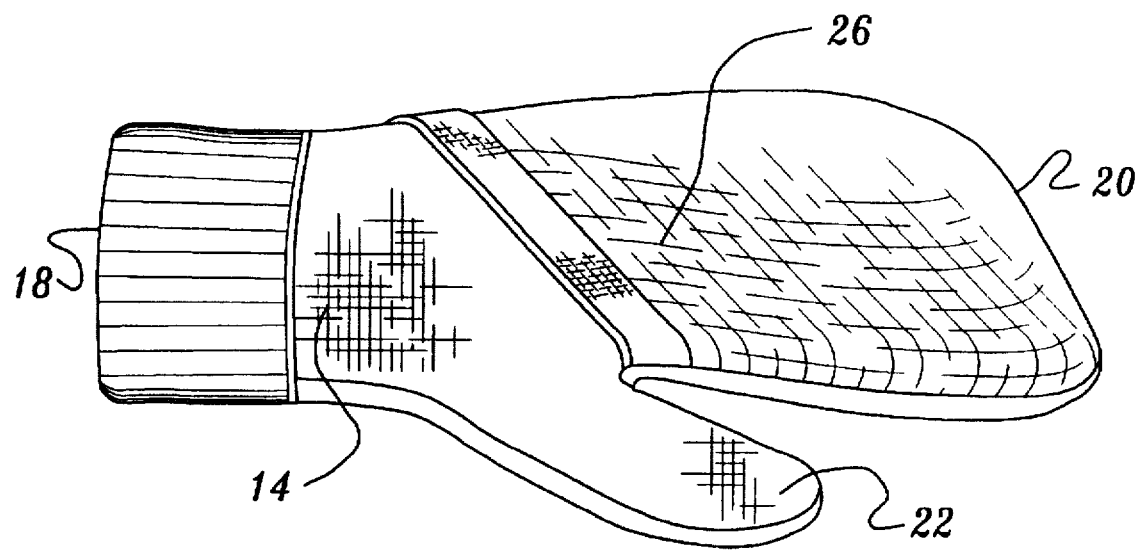
FIG. 2 is a side perspective view of the present invention.
Figure 3:
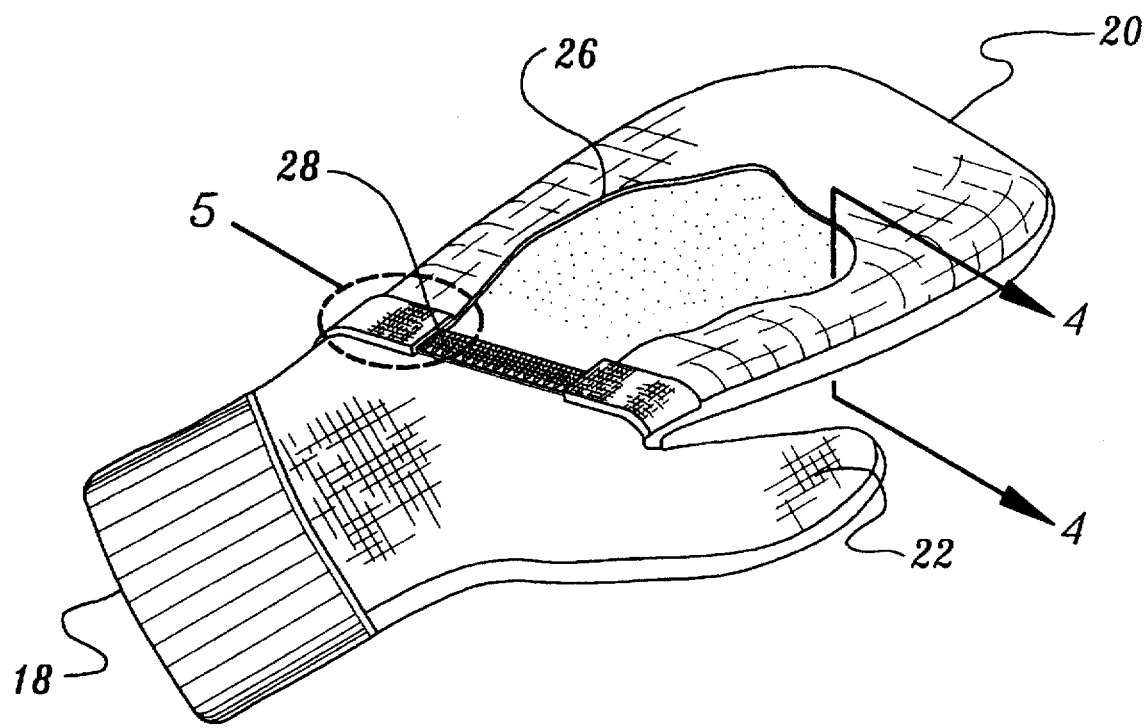
FIG. 3 is a plan perspective view of the present invention.
Figure 4:
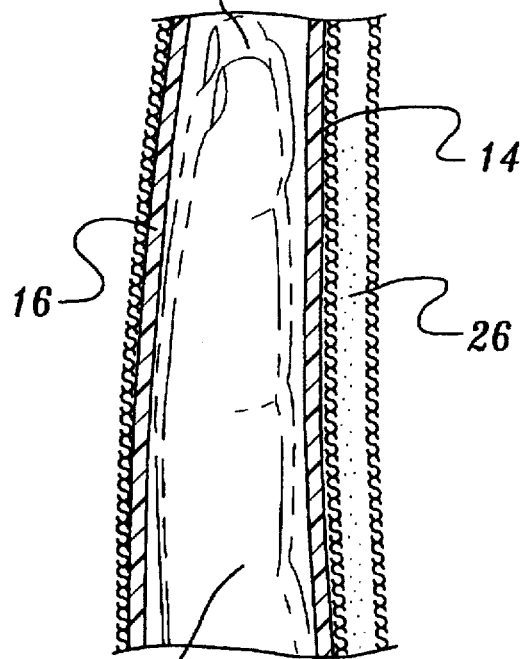
FIG. 4 is a cross-sectional view as taken along line 4—4 of FIG. 3.
Figure 5:
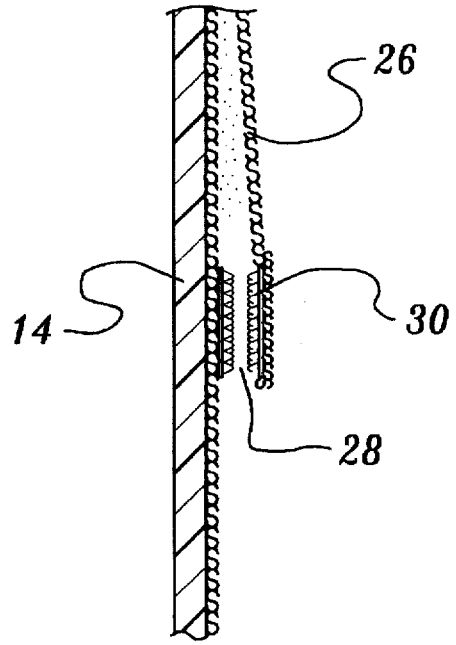
FIG. 5 is an enlarged side view of the closure of the mesh pouch of the present invention.

With reference now to the drawings, and in particular, to FIGS. 1–5 thereof, the preferred embodiment of the new and improved flea powder dispensing mitten embodying the principles and concepts of the present invention and generally designated by the reference number 10 will be described.

Specifically, it will be noted in the various Figures that the device relates to a new and improved flea powder dispensing mitten for dispensing flea powder through a meshwork associated therewith. In its broadest context, the device consists of a mitten and a mesh pouch. Such components are individually configured and correlated with respect to each other so as to attain the desired objective.

The device 10 includes a mitten 12 having an inner surface 14 and an outer surface 16 secured along marginal edges thereof to define a hand receiving chamber 17. The stitching used to secure the inner surface 14 and the outer surface 16 is omitted for clarity only, and may be of any type of stitching used for making mittens and gloves. The mitten 12 has an open hand receiving portion 18 for receipt of a hand 100 therethrough into the hand receiving chamber 17. The open hand receiving portion 18 is equipped with a wrist band preferably comprised of an elastic material to prevent the mitten from sliding off the hand 100 of the user while in use. The mitten 12 has a four finger section 20 and a thumb section 22. The four finger section 20 and the thumb section 22 are arranged similarly to mittens known in the art.

A mesh pouch 26 is secured to the inner surface 14 of the mitten 12. The mesh pouch 26 is positioned on a palm portion of the mitten 12. The mesh pouch 26 has an open lower end 28. The open lower end 28 has hook and loop fasteners 30 on opposing ends thereof to facilitate closure of the open lower end. 28 The mesh pouch 26 is adapted for receipt of a flea powder therein for application on a pet. Once the flea powder is placed within the mesh pouch 26, the mitten 12 is simply rubbed or patted over the body of the dog or cat or other domesticated animal to rid the animal of fleas. Other types of powders could also be used to facilitate the removal of other insects such as mites and ticks. The powder being positioned within the mesh pouch 26 prevents the powder from coming in contact with the applying hand of the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A flea powder dispensing mitten for dispensing flea powder through a meshwork associated therewith comprising, in combination:

a mitten constructed of a non-mesh material, the mitten having an inner surface and an outer surface secured along marginal edges thereof to define a hand receiving chamber, the mitten having an open hand receiving portion for receipt of a hand therethrough into the hand receiving chamber, the mitten having a four finger section and a thumb section;

a predetermined amount of flea powder; and a mesh pouch secured to the inner surface of the mitten, the mesh pouch having an open lower end, the open lower end having hook and loop fasteners on opposing ends thereof to facilitate closure of the open lower end, the mesh pouch receiving the flea powder therein for application on a pet.

* * * * *